US008294964B2

(12) United States Patent
He

(10) Patent No.: US 8,294,964 B2
(45) Date of Patent: Oct. 23, 2012

(54) CMYK TO CMYKK$_p$RGB TRANSFORM FOR HALFTONE DOT OVERLAP CONTROL

(75) Inventor: Zhen He, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 868 days.

(21) Appl. No.: 12/420,490

(22) Filed: Apr. 8, 2009

(65) Prior Publication Data
US 2010/0259802 A1 Oct. 14, 2010

(51) Int. Cl.
G03F 3/08 (2006.01)
H04N 1/60 (2006.01)
H04N 1/46 (2006.01)
G06K 9/00 (2006.01)

(52) U.S. Cl. ......... 358/529; 358/1.9; 358/534; 358/518; 382/167

(58) Field of Classification Search .................... 358/1.9, 358/534, 536, 529, 516, 518; 382/167, 162, 382/164, 165
See application file for complete search history.

(56) References Cited

U.S. PATENT DOCUMENTS

| | | | |
|---|---|---|---|
| 5,621,546 A | 4/1997 | Klassen et al. | |
| 5,748,785 A | 5/1998 | Mantell et al. | |
| 5,784,496 A | 7/1998 | Mantell | |
| 6,014,233 A | 1/2000 | Fan et al. | |
| 6,157,469 A | 12/2000 | Mestha | |
| 6,250,733 B1 | 6/2001 | Yao et al. | |
| 6,307,645 B1 * | 10/2001 | Mantell et al. | 358/1.9 |
| 6,501,564 B1 | 12/2002 | Schramm et al. | |
| 6,870,644 B2 | 3/2005 | Schramm et al. | |
| 7,499,203 B2 | 3/2009 | Yao | |
| 8,179,568 B2 * | 5/2012 | He | 358/1.9 |
| 2006/0132825 A1 | 6/2006 | Czudak et al. | |
| 2006/0215190 A1 | 9/2006 | Yao | |
| 2006/0227394 A1 | 10/2006 | He | |
| 2006/0238800 A1 | 10/2006 | Czudak et al. | |
| 2009/0195798 A1 * | 8/2009 | He | 358/1.9 |
| 2009/0296112 A1 * | 12/2009 | Gil et al. | 358/1.9 |
| 2010/0020339 A1 * | 1/2010 | He | 358/1.9 |

OTHER PUBLICATIONS

U.S. Appl. No. 11/093,352, filed Mar. 29, 2005, He.
U.S. Appl. No. 12/025,838, filed Feb. 5, 2008, He.
U.S. Appl. No. 12/025,842, filed Feb. 5, 2008, He.
U.S. Appl. No. 12/258,494, filed Oct. 27, 2008, He et al.
Shaked et al., "Ink Relocation for Color Halftones", ©Hewlett-Packard Company, 1999, p. 1-11.

* cited by examiner

Primary Examiner — Madelein A Nguyen
(74) Attorney, Agent, or Firm — Philip E. Blair; Fleit Gibbons Gutman Bongini & Bianco P.L.

(57) ABSTRACT

What is disclosed is a novel system and method for performing a CMYK to CMYKK$_p$RGB color transform which helps reduce engine-specific halftone artifacts in diverse printing devices capable of dot-on-dot printing. The present method lends adaptive color overlapping control to local color regions depending on the engine behaviors and imaging artifacts to be addressed. With such a transform, an added degree of flexibility is provided to a variety of halftoning algorithms to reduce engine-specific halftone artifacts. Advantageously, increased halftone image quality is effectuated for different engine behaviors in a computationally efficient manner. Various embodiments have been disclosed.

8 Claims, 5 Drawing Sheets

CMYK TO CMYKK$_p$RGB TRANSFORM FOR HALFTONE DOT OVERLAP CONTROL

TECHNICAL FIELD

The present invention is directed to methods for performing a CMYK to CMYKK$_p$RBG transform that controls the dot-overlapping strategy in printing devices capable of dot-on-dot printing.

BACKGROUND

Halftoning is the process of representing a continuous tone image by a bi-level image such that, when viewed from a suitable distance, the bi-level image gives the same impression as the contone image. Halftoning often employs a halftone screen. A halftone screen describes the set of values which together make up the set of thresholds to be applied in a halftone screening process to generate the output halftone patterns. A pattern of dots used to produce a particular shade of color is known as a halftone screen. A single-center halftone screen uses the entire area for one cell, or tile, only. The resolution of a halftone screen is defined by the number of lines of dots in one inch, measured parallel with the angle of the halftone screen. The higher the resolution of the halftone screen, the greater the detail that can be reproduced. Halftone screens use a matrix of threshold values. A halftone screen can be a data set with different print density values equally represented or with a controlled unequal distribution for gamma-compensated screens. For monochrome printing, the image data is then compared with the screen thresholds at each position. If the image data exceeds the threshold, a dot is printed. Otherwise, that particular location remains unprinted.

Halftoning techniques are widely employed in the printing of digital images. The general idea behind halftoning is that, by varying the density of the dots used to print the individual primary colors, Cyan, Magenta, Yellow and Black (CMYK), any shade can be reproduced. By varying dot density, the eye perceives a shade somewhere between the solid color and the color of the background paper. The effect has its limits. When the dots get too small or are spaced too far apart, the eye starts perceiving individual dots again and the image looks grainy.

For printing with multiple overlapping colors, halftoning presents particular challenges. For dot-on-dot printing, single halftoning screens tend to be used. This has the disadvantage of reducing a spatial frequency with respect to a distribution of dots printed at different locations. This tends to produce an image which appears grainy. The same can be said for clustered dot printing in which different color dots are printed adjacent to each other to create a multi-dot cluster that is visually perceived as some desired intermediate color.

For multi-function device applications, color error diffusion is a popular halftoning method due to its detail preservation and moiréresistance. Vector error diffusion is one color error diffusion method which produces good image quality because it achieves higher halftone quality compared to other channel-independent error diffusion methods. Methods for hierarchical error diffusion help control dot distribution for both primary and secondary color dot formation which covers the class of error diffusion that follow telescopic dot firing constraints. One key element in vector halftoning and hierarchical error diffusion is the CMYK to CMYKRGB color transform that helps controls the dot-overlapping strategy.

Accordingly, what is needed in this art are increasingly sophisticated methods for performing a CMYK to CMYKK$_p$RBG transform to help reduce engine-specific halftone artifacts in printing devices capable of dot-on-dot printing.

BRIEF SUMMARY

What is disclosed is a novel CMYK to CMYKK$_p$RBG transform to help reduce engine-specific halftone artifacts in printing devices capable of dot-on-dot printing. The present method lends adaptive color overlapping control to local color regions depending on the engine behaviors and artifacts intended to be addressed. With such a color transform, an added degree of flexibility is provided to a variety of halftoning algorithms to reduce engine-specific halftone artifacts. Advantageously, increased halftone image quality is effectuated for different engine behaviors in a computationally efficient manner.

The present method transforms input CMYK values into output CMYKK$_p$RGB. Input percentage coverages (referred to as $c_i$, $m_i$, $y_i$, and $k_i$) of each CMYK channel of an image input device (such as a color scanner) are received. A minimum amount of composite-K, $k_{min}$, necessary to maintain an input ink coverage is determined. A maximum amount of composite-K, $k_{max}$, is also determined. An amount of a flexible composite-K, $k_p$, is determined. The amount of $k_p$ is then removed from each of the input coverages $c_i$, $m_i$, and $y_i$ to obtain an amount of a remaining $c_1$, $m_1$, and $y_1$ coverage. A total coverage area of a secondary color RGB dot, rgb area, is determined. Output secondary colors are based upon rgb area. Output primary colors are based on the output secondary color values. The resulting color values are then provided to a halftoning algorithm (or to a storage device). Various embodiments are disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
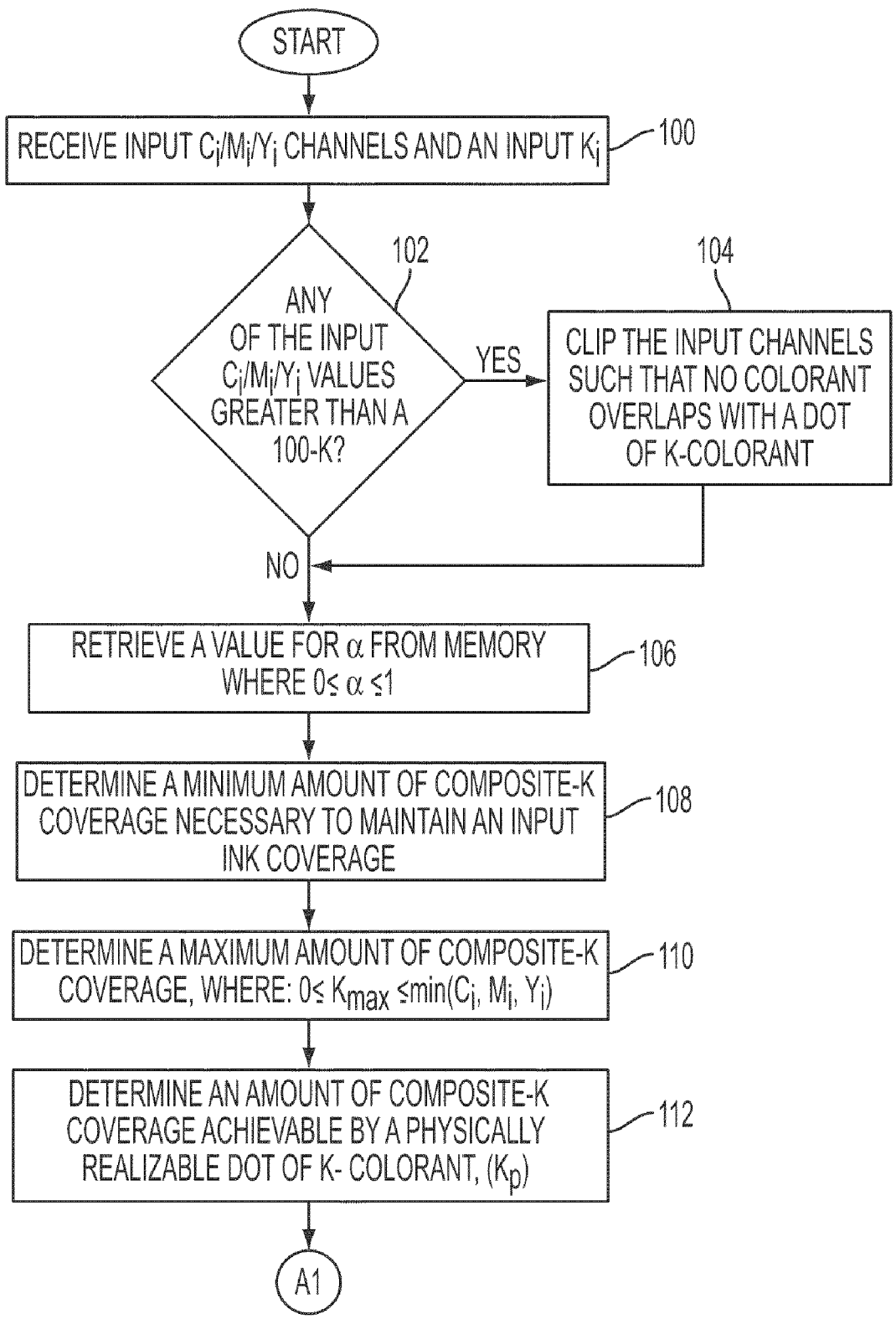
FIG. 1 is a flow diagram of one example embodiment of the CMYK to CMYKK$_p$RBG transform of the present method.

What is provided is a novel method for performing a CMYK to CMYKK$_p$RBG transform that controls the dot-overlapping strategy in printing devices capable of dot-on-dot printing.

INCORPORATION BY REFERENCE

The following commonly assigned US references are incorporated herein in their entirety by reference.

[1] U.S. Pat. No. 6,250,733, entitled: "Color Printer Halftoning Method", to Yao et al.
[2] U.S. Pat. 7,952,764, entitled: "Hierarchical Color Error Diffusion In A CYMKRGB Domain", to Zhen He.
[3] U.S. Pat. 7,916,349, entitled: "Color Pixel Error Diffusion In A CMYK Input Color Space", to He et al.
[4] U.S. Pat. 7,499,203, entitled "Color Printing", to Meng Yao.
[5] U.S. Pat. 7,978,371, entitled: "Vector Half-Toning With Minimum Luminance Variation Dot Formation", to Zhen He.
[6] U.S. Pat. 7,715,044, entitled: "Two-Dimensional Gray Component Replacement", to Zhen He.

It should be understood that one of ordinary skill in this art would be readily familiar with many facets of color science such as, but not limited to, halftoning processes, halftone screens, dot-on-dot printing systems, color space, color gamuts, and other related techniques commonly found in this art. One skilled in this art would be familiar with the text: *Digital Color Imaging Handbook*, 1$^{st}$ Ed. CRC Press (2003), ISBN-10: 084930900X, ISBN-13: 978-0849309007, which is incorporated herein in its entirety by reference. One of ordinary skill in this art would also be familiar with advanced mathematical techniques use in various color manipulation and color transformation algorithms. One of ordinary skill would be knowledgeable about computer science and software and programming systems and methods sufficient to implement the functionality and capabilities described in detail herein in their own color management systems and environments without undue experimentation.

An "image input device" is any device capable of receiving or otherwise obtaining color values of an image. The set of image input devices is intended to encompass a wide variety of image capture devices. The set of image capture devices includes scanners, cameras, photography equipment, facsimile machines, photo reproduction equipment, digital printing presses, xerographic devices, and other devices capable of reducing an image to a digitized representation thereof. A scanner is one image input device that optically scans an image and converts the scanned image to a digitized form.

An "image output device" is a device which receives a signal of an image and performs or otherwise provides the signal to a halftoning algorithm, is capable of storing the received image signal to a memory or a storage device, is capable of reducing the signal of the image to a viewable form, or is capable of communicating the signal of the image to another device. The set of image output devices includes color marking devices, computer workstations, document reproduction systems, facsimile machines, and the like.

A key element in a vector halftoning algorithm and hierarchical error diffusion is the CMYK to CMYKK$_p$RBG transform that controls the dot-overlapping strategy in a color marking device capable of dot-on-dot printing. An important variation thereof, disclosed in [4], allows one secondary color of a non-zero density. Such a constraint works well with certain print engines that tend to produce grainier secondary dots due to their jet-dependent dot positioning. The transform in [4] inevitably increases K dot percentage and therefore shows more graininess at some mid-tone to shadow areas. The transform in [5] minimizes the density coverage of more visible dots and therefore minimizes the halftone graininess at the density level from a bitmap perspective. Visible graininess reduction can be observed from the bitmaps generated using the transform of [5] when compared against those bitmaps generated by the transform of [4]. The present transform builds on these algorithms in an effort to optimize halftone image quality for different print engine behaviors.

Several assumptions are made herein. First, it is assumed that any C, M and Y color dot overlapping is replaced by an amount of a K-colorant. Second, no other colorant is allowed to overlap with colorant K. Third, it is assumed that the ink coverage of each colorant is scaled to a value from 0 to 100. One skilled in this art would understand that such constraints are typical for printing devices. These assumptions should not be viewed as limiting. If necessary, these can be modified or removed.

Reference is now made to the flow diagram of FIG. 1 which illustrates one example embodiment of the present CMYK to CMYKK$_p$RBG transform.

At 100, input percentage coverage of each channel $c_i/m_i/y_i/k_i$ are received from an image input device. In one example embodiment, the input channels are those of a color scanning device which scans a color image into a digitized form. Example color devices capable of receiving a color image and reducing the received image to a signal of CMYK color values are known.

At 102, a determination is made whether any of the input $c_i/m_i/y_i$ are greater than 100-$k_i$. If any of the input $c_i/m_i/y_i$ are greater than 100-$k_i$, then, at 104, they are clipped such that no colorant overlaps with a dot of K colorant.

At 106, a value for a parameter, α, is retrieved. The parameter can be retrieved from a memory or storage device. The parameter is user-adjustable using an interface whereon the user enters a value for α. Alternatively, α is pre-set to a default value. The value of the parameter α preferably is between 0 and 1, inclusive. When α=0, the present transform method produces a halftone result which is the same as the result of the transform method described in [5]. When α=1.0, the present method produces a halftone result which is the same as the result of the transform method of [4].

One embodiment of α defined as a function of input $c_i/m_i/y_i/k_i$ is given by:

$$\alpha = f(c_i + m_i + y_i) \cdot g(\min(c_i, m_i, y_i)/\max(c_i, m_i, y_i)) \cdot h(k_i), \quad (1)$$

where f( ) and g( ) are functions which control the composite-K usage along a neutral axis and a chroma magnitude direction, respectively, and where h( ) is dependent on input $k_i$ coverage. In one simplified case, h( )=1.0. Each of the above functions can be implemented as a 1-D look-up table (LUT). Since, for many solid-ink printing products, k=0, only two 1-D LUTs are needed, one for each of f( ) and g( ). In such a manner, the present transform method can be made more computationally efficient.

At 108, a minimum amount of composite-K coverage necessary to maintain an input ink coverage is determined. In one embodiment, $k_{min}$ is given by:

$$k_{min} = \max(0, (c_i + m_i + y_i + 2k_i - 200)). \quad (2)$$

At 110, a maximum amount of composite-K coverage that excludes the co-existence of composite-K and white pixel dot, is determined such that a secondary and tertiary dot (composite-K) coverage is not co-existent with positive white space coverage in the output of the transform. In one embodiment, $k_{max}$ is given by:

$$k_{max} = \min(\min(c_i, m_i, y_i), \max(0, (0.5 \ast (c_i + m_i + y_i + k_i)) - 50)), \quad (3)$$

where $0 \leq k_{max} \leq \min(c_i, m_i, y_i)$, for the non-negativity and a maximum composite-K upper bound set by input $c_i/m_i/y_i$ coverages.

At 112, an amount of a flexible composite-K coverage achievable by a physically realizable dot of K colorant is determined. This value is based on the parameter α and the values determined for each of $k_{min}$ and $k_{max}$. In one embodiment, $k_p$ is given by:

$$Kp=k_p=k_{min}+\alpha \cdot (k_{max}-k_{min}). \quad (4)$$

The flexibility of $k_p$, based in part on the parameter α, makes the amount of composite-K coverage adjustable to accommodate varying print engine behaviors.

Figure 2:
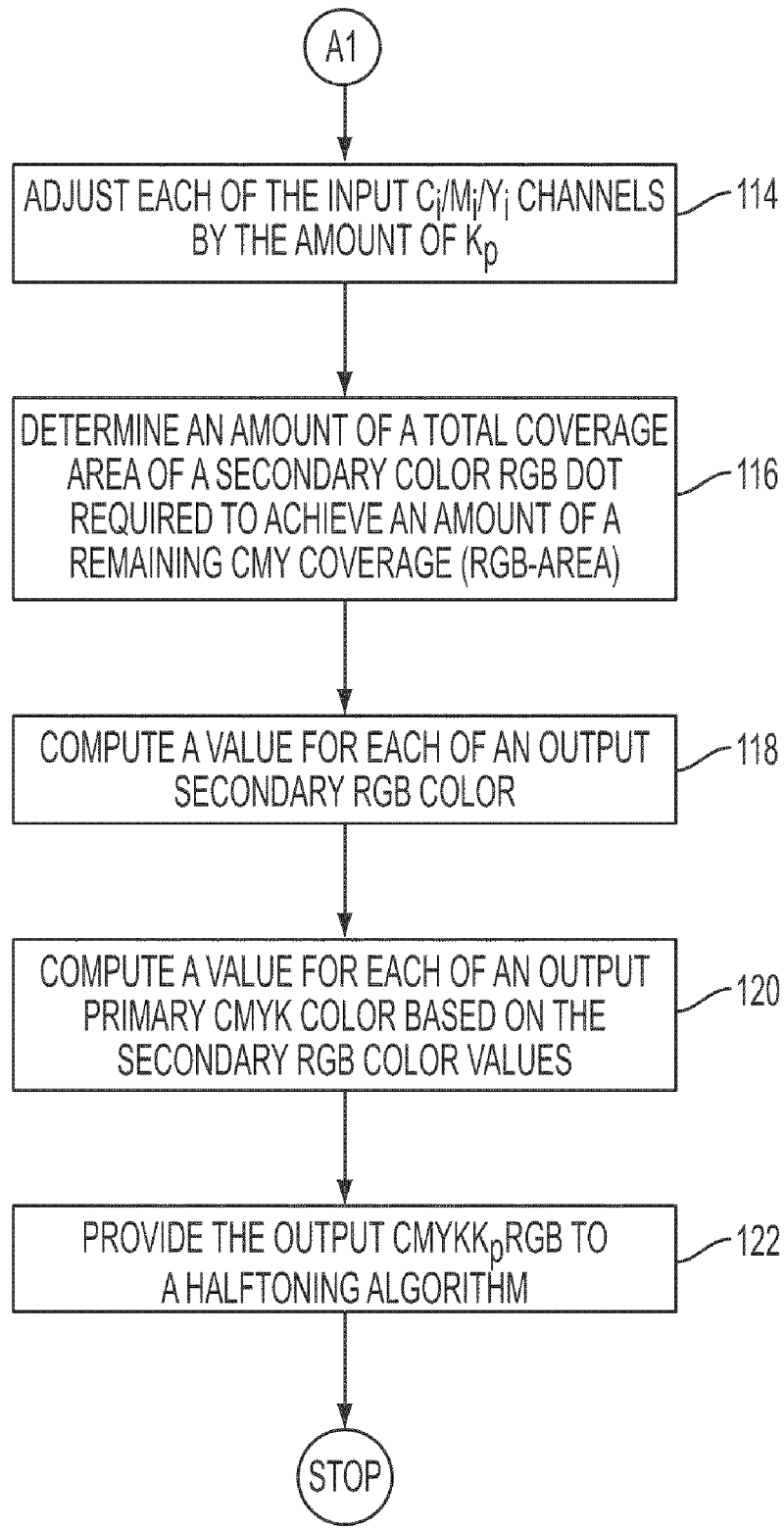
FIG. 2 which is a continuation of the flow diagram of FIG. 1 with processing continuing with respect to node A1.

Reference is now being made to the flow diagram of FIG. 2 which is a continuation of the flow diagram of FIG. 1 with processing continuing with respect to node A1.

At 114, the amount of $k_p$ is subtracted from each of the input $c_i/m_i,y_i$ to determine an amount of a remaining $c_1/m_1/y_1$ coverage area. In one embodiment, this is determined as follows:

$$c_1=c_i-k_p; \quad (5)$$

$$m_1=m_i-k_p; \quad (6)$$

$$y_1=y_i-k_p. \quad (7)$$

It should be appreciated that $c_1$, $m_1$, and $y_1$ are temporary variables.

At 116, an amount of a total coverage area of a secondary color RGB dot required to achieve the amount of remaining $c_1/m_1/y_1$ coverage is determined. In one embodiment, rgb_area is given by:

$$rgb\_area=\max((c_1+m_1+y_1)-100+k_i+k_p,0). \quad (8)$$

If the total coverage of a secondary color RGB dot area is zero then the input $c_i/m_i/y_i$ coverages comprise all of the primary color coverage area and no RGB dot coverage is needed. Any portion of $c_i/m_i/y_i$ that is greater than rgb_area belongs to the primary color coverage because the same colorant cannot overlap itself.

At 118, output secondary color values are determined based on the total coverage area of a secondary color RGB dot and $c_1/m_1/y_1$. In one embodiment, the output secondary color values are given by:

$$B=b=rgb\_area-\min(y_1,rgb\_area); \quad (9)$$

$$R=r=rgb\_area-b-\min(c_1-b, rgb\_area-b); \quad (10)$$

$$G=g=rgb\_area-b-r. \quad (11)$$

At 120, output primary color values are based on the output secondary color values. In one embodiment, the output primary color values are given by:

$$C=c=c_1-b-g; \quad (12)$$

$$M=m=m_1-b-r; \quad (13)$$

$$Y=y=y_1-r-g; \quad (14)$$

$$K=k=k_i. \quad (15)$$

At 122, the output primary and output secondary color values (collectively referred to as CMYKK$_p$RBG) are provided to a halftoning algorithm. The above-determined outputs will be used in a variety of halftoning algorithms known in the arts. One example halftoning algorithm is disclosed in [1]. One of ordinary skill would appreciate the use of the above-determined output coverages in a halftoning method. Such halftoning methods vary by device and by the objectives intended to be achieved. As such, a further discussion as to any particular halftoning method known in the arts has been omitted. It should be noted that composite-K generation is different from the concept of gray-component removal (GCR). GCR should be regarded as an independent control to generate input $c_i,m_i,y_i,k_i$ overages. Whereas, the present method controls how CMY colorants overlap.

Figure 3:
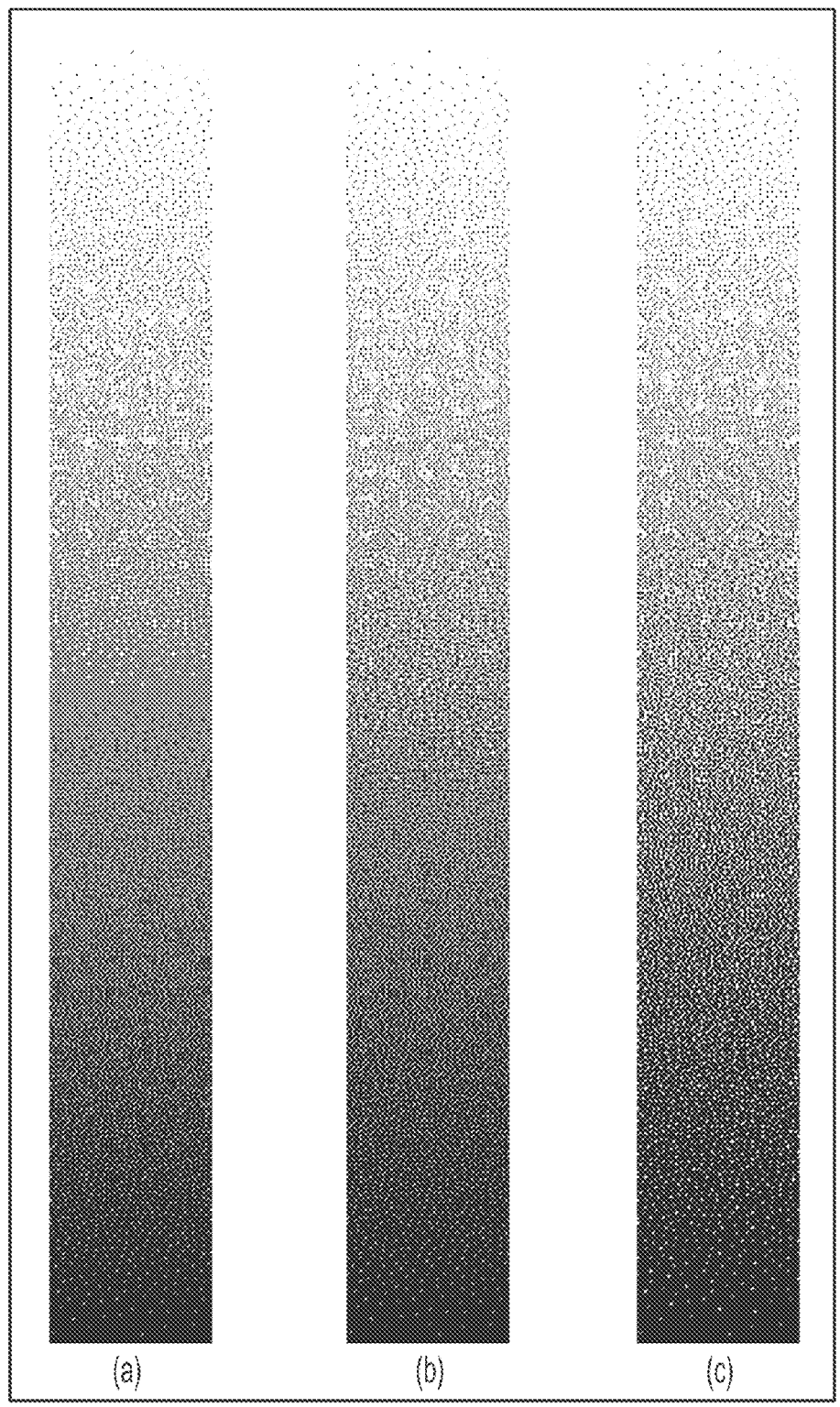
FIG. 3 illustrates a halftone comparison of equal CMY sweep with different α values, wherein α=0.0, α=0.5, and α=1.0.

The above-described transform method was embedded into a vector halftoning algorithm to generate a halftone bitmap wherein an equal-CMY contone sweep was halftoned using the present method with α=0.0, α=0.5 and α=1.0. FIG. 3A shows the halftone result with α=0.0 which achieved a result which is the same as the transform method of [5]. FIG. 3B shows the halftone result hereof using α=0.5. FIG. 3C shows the halftone result using α=1.0 which achieved a result which is the same as the transform method of [4].

Figure 4:
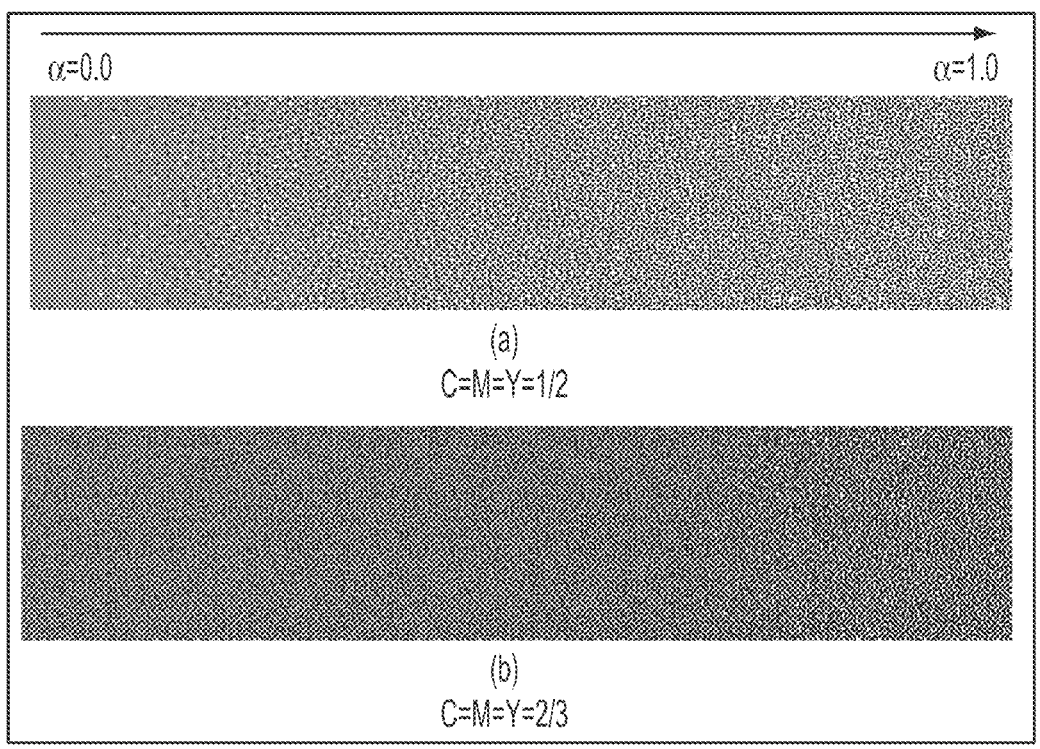
FIG. 4 shows two halftone bitmap examples to illustrate the effect of changing α continuously from 0 to 1.0 in a horizontal direction.

FIG. 4 shows the smooth transition property of the present transform method. A value for α was linearly varied from 0.0 to 1.0, horizontally from left to right. Two fixed levels, ½ and ⅔, of equal CMY were used. FIG. 4 illustrates that the present method effectuates a smooth texture transition without any artifacts having been introduced across varying values of α.

In sum, a generalized CMYK to CMYKK$_p$RBG transform is presented which includes two previous transforms, disclosed in [4] and [5], as its boundary cases and which is capable of blending these two boundary cases seamlessly without generating halftone texture artifacts for vector halftoning and hierarchical error diffusion algorithms.

Figure 5:
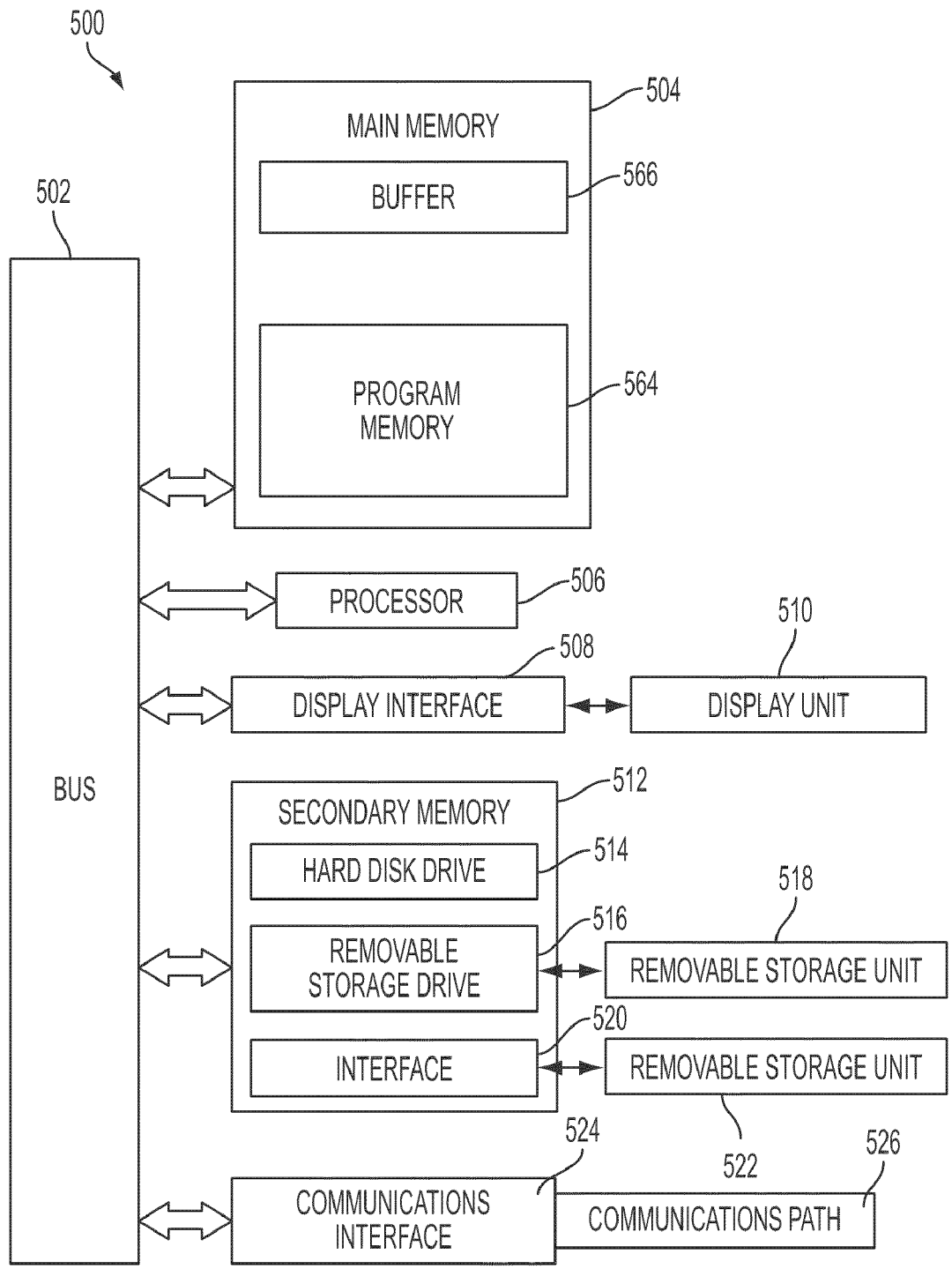
FIG. 5 is a block diagram of one example embodiment of a special purpose computer system useful for implementing various aspects of the present method.

Reference is now made to FIG. 5 which illustrates a block diagram of one embodiment of a special purpose computer useful for implementing various embodiments of the present method. The illustrated special purpose computer 500 includes processor 506 capable of executing machine executable program instructions for performing the present method. The processor is in communication with bus 502. Main memory 504 memory stores data and may include random access memory to support reprogramming. Buffer 566 stores data. Program memory 564 stores executable instructions for implementing various aspects of the present method. Display interface 508 forwards data from communication bus 502 to display 510. Secondary memory 512 facilitates the execution of various embodiments hereof. Disk drive 514 and removable storage 516 read/write to removable storage unit 518. Storage unit 522 exchanges data through interface 520. Interface 524 allows software and data to be transferred to external devices. Software, data, and computer programs transferred and/or received via interface 524 may be in the form of signals such as, for example, electronic, electromagnetic, optical, or any other signals capable of being received by communications interface. These signals are communicated via channels designed to carry such signals such as, for example, wire, cable, fiber-optic, phone-line, cellular-link, RF, or other channels. Such a system may be integrated into a workstation, an image input device, or an image output device configured, at least in part, to perform one or more aspects of the present method. The system may be placed in communication with, for instance, a scanning device for receiving the input color channels or be integrated with various devices such as, for example, a colorimeter, spectrometer, spectrophotometer, or another device for measuring color values. The present method can be implemented on a micro-processor, microcontroller, an ASIC or other integrated circuit, a DSP, an electronic circuit such as a discrete element circuit, a programmable device such as a PLD, PLA, FPGA, PAL, PDA, and the like. In general, any device capable of implementing a finite state machine that is in turn capable of implementing one or more elements of the flow diagrams provided herewith, or portions thereof, can be used. Portions of the flow diagrams may also be implemented partially or fully in hardware in conjunction with machine executable instructions.

The term computer program product is intended to include any computer readable medium, computer executable medium, computer usable medium, or machine readable media capable of providing instructions and/or data to a computer system for implementing one or more aspects of the present method as described above. The computer program product is capable of storing data, instructions, messages packets, or other machine readable information, and includes non-volatile memory, such as a floppy disk, hard drive and volatile memory such as ROM, RAM, flash, and the like. It may further include a CD-ROM, DVD, tape, cassette, or other digital or analog media, capable of having embodied thereon one or more logical programming instructions or other machine executable codes or commands that implement and facilitate the function, capability, and methods disclosed herein. The computer program product may additionally contain information held in a transitory state such as a network link or a network interface which may include a wired network or a wireless network which allows a computer to read such computer readable information. The special purpose computer can be integrated, in whole or in part, It should be understood that the flow diagram hereof are intended to be illustrative. Other operations, for example, may be added, modified, enhanced, condensed, integrated, or consolidated. Variations thereof are intended to fall within the scope of the appended claims.

It should also be understood that one or more aspects of the present method are intended to be incorporated in an article of manufacture, including one or more computer program products. The article of manufacture may be included on at least one storage device readable by a machine architecture, xerographic, color management, or other image processing system capable of executing program instructions. The article of manufacture may be included as part of a xerographic system, color management system, an operating system, a software program, a plug-in. Such an article of manufacture may further be shipped, sold, leased, or otherwise provided separately either alone or as part of an add-on, update, upgrade, or product suite by the present assignee or a licensee thereof.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A computer implemented method for performing a CMYK to CMYKK$_p$RGB color transform in a color marking device capable of dot-on-dot printing, the method comprising:

receiving, from an image input device, an input percentage coverage $c_i$, $m_i$, $y_i$, and $k_i$, of each channel of said image input device;

determining a minimum amount of composite-K coverage, $k_{min}$, comprising:

$$max(0,(c_i+m_i+y_i+2k_i-200);$$

determining a maximum amount of composite-K coverage, $k_{max}$, comprising:

$$min(min(c_i,m_i,y_i), max(0,(0.5*(c_i+m_i+y_i+k_i))-50));$$

determining an amount of a flexible composite-K coverage, $k_p$, comprising:

$$k_{min}+\alpha \cdot (k_{max}-k_{min}),$$

where $\alpha$ is a function of said input values $c_i$, $m_i$, $y_i$, and $k_i$;

determining an amount of a remaining coverage area for each of $c_1$, $m_1$, and $y_1$ comprising:

$$c_1=c_i-k_p;$$

$$m_1=m_i-k_p; \text{ and}$$

$$y_1=y_i-k_p;$$

determining an amount of a total coverage area of a secondary color RGB dot, rgb_area, comprising:

$$rgb\ area=max((c_1+m_1+y_1)-100+k_i+k_p,0);$$

determining each of an output secondary color value, comprising:

$$b=rgb\ area-min(y_1,rgb\ area);$$

$$r=rgb\ area-b-min(c_1-b, rgb\ area-b); \text{ and}$$

$$g=rgb\ area-b-r;$$

determining each of an output primary color value comprising:

$$c=c_1-b-g;$$

$$m=m_1-b-r;$$

$$y=y_1-r-g; \text{ and}$$

$$k=k_i; \text{ and}$$

providing said c, m, y, k, $k_p$, r, g, and b values to a halftoning algorithm.

2. The method of claim 1, wherein $\alpha$ has a value between 0 and 1, inclusive, and comprises:

$$\alpha=f(c_i+m_i+y_i)\cdot g(min(c_i,m_i,y_i)/max(c_i,m_i,y_i))\cdot h(k_i),$$

where f( ) and g( ) are functions which control the composite-K usage along a neutral axis and a chroma magnitude direction, respectively, and where h( ) is dependent on input $k_i$, coverage.

3. The method of claim 1, further comprising, in response to said $c_i$, $m_i$, and $y_i$, being greater than a predetermined threshold, clipping said $c_i$, $m_i$, $y_i$, inputs such that no colorant overlaps with a dot of K colorant.

4. The method of claim 1, wherein $0 \leq k_{max} \leq min(c_i,m_i,y_i)$.

5. A system for performing a CMYK to CMYKK$_p$RGB color transform in a color marking device capable of dot-on-dot printing, the system comprising:

an image input device;

a memory and a storage medium;

a processor in communication with said memory and said storage medium, said processor executing machine readable instructions for performing:

receiving, from said image input device, an input percentage coverage $c_i$, $m_i$, $y_i$, and $k_i$ of each channel of said image input device;

determining a minimum amount of composite-K coverage, $k_{min}$, comprising:

$$max(0,(c_i+m_i+y_i+2k_i-200);$$

determining a maximum amount of composite-K coverage, $k_{max}$, comprising:

$$min(min(c_i,m_i,y_i), max(0,(0.5*(c_i+m_i+y_i+k_i))-50));$$

determining an amount of a flexible composite-K coverage, $k_p$, comprising:

$$k_{min}+\alpha \cdot (k_{max}-k_{min}),$$

where $\alpha$ is a function of said input values $c_i$, $m_i$, $y_i$, and $k_i$;

determining an amount of a remaining coverage area for each of $c_1$, $m_1$, and $y_1$ comprising:

$$c_1=c_i-k_p;$$

$$m_1=m_i-k_p; \text{ and}$$

$$y_1=y_i-k_p;$$

determining an amount of a total coverage area of a secondary color RGB dot, rgb_area, comprising:

$$rgb\ area=\max((c_1+m_1+y_1)-100+k_i+k_p,0);$$

determining each of an output secondary color value, comprising:

$$b=rgb\ area-\min(y_1,rgb\ area);$$

$$r=rgb\ area-b-\min(c_1-b,\ rgb\ area-b); \text{ and}$$

$$g=rgb\ area-b-r;$$

determining each of an output primary color value comprising:

$$c=c_1-b-g;$$

$$m=m_1-b-r;$$

$$y=y_1-r-g; \text{ and}$$

$$k=k_i; \text{ and}$$

providing said c, m, y, k, $k_p$, r, g, and b values to said storage medium.

6. The system of claim 5, wherein $\alpha$ has a value between 0 and 1, inclusive, and comprises:

$$\alpha=f(c_i+m_i+y_i)\cdot g(\min(c_i,m_i,y_i)/\max(c_i,m_i,y_i))\cdot h(k_i),$$

where f( ) and g( ) are functions which control the composite-K usage along a neutral axis and a chroma magnitude direction, respectively, and where h( ) is dependent on input $k_i$, coverage.

7. The system of claim 5, further comprising, in response to said $c_i$, $m_i$, and $y_i$, being greater than a predetermined threshold, clipping said $c_i$, $m_i$, $y_i$, inputs such that no colorant overlaps with a dot of K colorant.

8. The system of claim 5, wherein $0 \leq k_{max} \leq \min(c_i,m_i,y_i)$.

* * * * *